(12) United States Patent
Seo

(10) Patent No.: US 12,140,695 B2
(45) Date of Patent: Nov. 12, 2024

(54) RADAR CONTROL DEVICE AND METHOD

(71) Applicant: HL KLEMOVE CORP., Incheon (KR)

(72) Inventor: Hyeon Deog Seo, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 295 days.

(21) Appl. No.: 17/675,356

(22) Filed: Feb. 18, 2022

(65) Prior Publication Data

US 2022/0268888 A1 Aug. 25, 2022

(30) Foreign Application Priority Data

Feb. 19, 2021 (KR) .................. 10-2021-0022500

(51) Int. Cl.
*G01S 7/41* (2006.01)
*G01S 13/72* (2006.01)
*G01S 13/931* (2020.01)

(52) U.S. Cl.
CPC .............. *G01S 7/414* (2013.01); *G01S 7/415* (2013.01); *G01S 13/723* (2013.01); *G01S 13/931* (2013.01); *G01S 2013/93271* (2020.01)

(58) Field of Classification Search
CPC ........ G01S 7/414; G01S 7/415; G01S 13/723; G01S 13/931; G01S 2013/93271
USPC .......................................................... 342/162
See application file for complete search history.

(56) References Cited

U.S. PATENT DOCUMENTS

| 6,348,889 | B1 * | 2/2002 | Ashihara | G01S 7/4004 |
| | | | | 342/85 |
| 6,469,659 | B1 * | 10/2002 | Lajiness | G01S 7/4004 |
| | | | | 342/91 |
| 6,680,689 | B1 * | 1/2004 | Zoratti | B60Q 9/008 |
| | | | | 340/436 |

(Continued)

FOREIGN PATENT DOCUMENTS

| KR | 10-2016-0144729 A | 12/2016 |
| KR | 10-2017-0075474 A | 7/2017 |

(Continued)

OTHER PUBLICATIONS

Korean Office Action issued on Feb. 20, 2024, in connection with the Korean Patent Application No. 10-2021-0022500, with its English translation, 8 pages.

(Continued)

*Primary Examiner* — Nuzhat Pervin
(74) *Attorney, Agent, or Firm* — Hauptman Ham, LLP

(57) ABSTRACT

The embodiments of the present disclosure relate to a radar control device and method. Specifically, a radar control device according to the present disclosure may include an antenna unit including one or more transmission antennas and one or more receiving antennas, a transmitter for transmitting a radar signal toward an object using the transmission antenna, a receiver for receiving a reception signal reflected from the object using the receiving antenna, and an object detector configured to determine a track for an detected object based on the reception signal, detect an object around a host vehicle based on the determined track, (Continued)

and, if a traveling speed of the host vehicle is less than or equal to a predetermined speed and the detected object is plural, classify a preceding vehicle and a clutter based on the reception signal.

12 Claims, 7 Drawing Sheets

(56) References Cited

U.S. PATENT DOCUMENTS

| | | | | |
|---|---|---|---|---|
| 6,684,149 | B2* | 1/2004 | Nakamura | B60W 30/16 |
| | | | | 180/170 |
| 7,136,013 | B2* | 11/2006 | Hanawa | B60K 31/00 |
| | | | | 342/134 |
| 8,473,171 | B2* | 6/2013 | Zagorski | G08G 1/166 |
| | | | | 340/425.5 |
| 8,676,466 | B2* | 3/2014 | Mudalige | G08G 1/163 |
| | | | | 701/32.7 |
| 9,469,307 | B2* | 10/2016 | Solyom | B60W 10/20 |
| 9,689,983 | B2* | 6/2017 | Cao | G01S 13/42 |
| 9,731,729 | B2* | 8/2017 | Solyom | B60W 10/04 |
| 9,958,541 | B2* | 5/2018 | Kishigami | G01S 13/26 |
| 10,126,417 | B2* | 11/2018 | Shikatani | G01S 13/04 |
| 10,247,816 | B1* | 4/2019 | Hoffmann | G01S 13/931 |
| 10,823,855 | B2* | 11/2020 | Li | G01S 7/4808 |
| 10,877,148 | B2* | 12/2020 | Duque Biarge | G01S 13/505 |
| 11,104,332 | B2* | 8/2021 | King | B60W 30/09 |
| 11,124,185 | B2* | 9/2021 | King | G06N 20/20 |
| 11,458,912 | B2* | 10/2022 | Kroeger | G01S 7/4972 |
| 11,663,726 | B2* | 5/2023 | Das | G06T 7/20 |
| | | | | 701/28 |
| 11,815,889 | B2* | 11/2023 | Kuo | G05D 1/0061 |
| 11,851,075 | B2* | 12/2023 | Woo | B60W 50/0205 |
| 2005/0242986 | A1* | 11/2005 | Hanawa | G01S 13/32 |
| | | | | 342/72 |
| 2011/0267219 | A1* | 11/2011 | Kisliansky | G01S 13/426 |
| | | | | 342/159 |
| 2012/0310466 | A1* | 12/2012 | Fairfield | G05D 1/0246 |
| | | | | 701/28 |
| 2013/0024084 | A1* | 1/2013 | Yamashiro | B60W 30/165 |
| | | | | 701/96 |
| 2013/0282236 | A1* | 10/2013 | Kato | G08G 1/166 |
| | | | | 701/36 |
| 2015/0309167 | A1* | 10/2015 | Shikatani | G01S 13/18 |
| | | | | 342/27 |
| 2015/0369912 | A1* | 12/2015 | Kishigami | G01S 13/34 |
| | | | | 342/104 |
| 2016/0124084 | A1* | 5/2016 | Lim | G01S 13/931 |
| | | | | 342/160 |
| 2017/0184702 | A1* | 6/2017 | Lee | G01S 7/354 |
| 2020/0241139 | A1* | 7/2020 | Roos | G01S 17/931 |
| 2021/0055401 | A1* | 2/2021 | Takayama | G01S 7/4056 |

FOREIGN PATENT DOCUMENTS

| | | |
|---|---|---|
| KR | 10-1803648 B1 | 11/2017 |
| KR | 10-2013224 B1 | 10/2019 |

OTHER PUBLICATIONS

Notice of Allowance dated Jul. 15, 2024 for corresponding Korean Patent Application No. 10-2021-0022500, along with an English machine translation (4 pages).

* cited by examiner

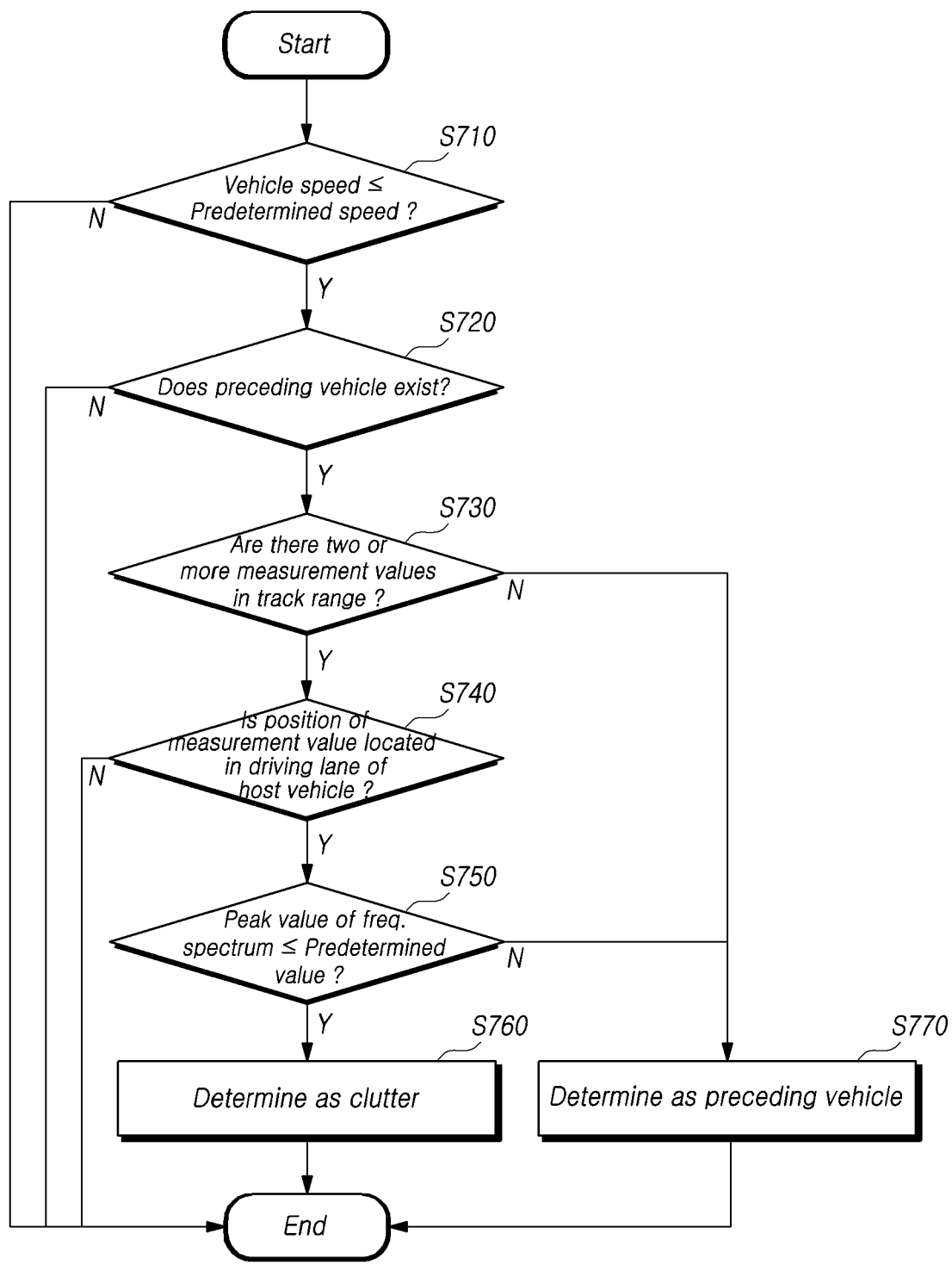

RADAR CONTROL DEVICE AND METHOD

CROSS REFERENCE TO RELATED APPLICATION

This application claims priority from Korean Patent Application No. 10-2021-0022500, filed on Feb. 19, 2021, which is hereby incorporated by reference for all purposes as if fully set forth herein.

TECHNICAL FIELD

An embodiment of the present disclosure relates to a radar control device and method for detecting a clutter.

In a situation in which a vehicle radar sensor is gradually becoming popular, there is being developed a technology capable of providing various driver convenience function using the vehicle radar. For example, autonomous driving control function such as an adaptive cruise control (ACC) or smart cruise control (SCC) automatically controls the speed or steering of the vehicle based on the detected forward condition (which may include the presence of a preveding vehicle).

This autonomous driving control technology may control a host vehicle at a set speed when there is no preceding vehicle ahead, and, in case of detecting a preceding, may control the host vehicle to follow the speed of the preceding vehicle in order to maintain a constant distance from the preceding vehicle.

Here, the detection of a preceding vehicle means a detection of a case in which a vehicle exists within a set detection range in a general environment, and if the vehicle does not exist within the set detectin range, it is determined that the preceding vehicle does not exist.

Meanwhile, the detection performance of the radar sensor may be maintained to some extent in heavy rain or fog situations in which visibility is not secured, but the detection performance of the radar sensor may deteriorate in a situation where various steel structures exist on the road.

Accordingly, a general autonomous driving control technology based on a radar sensor may cause a problem in that it cannot safely control a vehicle traveling in a section where various steel structures and roads under construction exist on the road.

SUMMARY

In this background, embodiments of the present disclosure provide a radar control device and method capable of classifying a clutter using track data around the host vehicle traveling at a predetermined speed or less.

In an aspect of the present disclosure, there is provided a radar control device including an antenna unit including one or more transmission antennas and one or more receiving antennas, a transmitter for transmitting a radar signal toward an object using the transmission antenna, a receiver for receiving a reception signal reflected from the object using the receiving antenna, and an object detector configured to determine a track for an detected object based on the reception signal, detect an object around a host vehicle based on the determined track, and, if a traveling speed of the host vehicle is less than or equal to a predetermined speed and the detected object is plural, classify a preceding vehicle and a clutter based on the reception signal.

In another aspect of the present disclosure, there is provided a radar control method including transmitting a radar signal toward an object using a transmission antenna and receiving a reception signal reflected from the object using a receiving antenna, determining a track for an detected object based on the reception signal, and detecting an object around a host vehicle based on the determined track, and classifying a preceding vehicle and a clutter based on the reception signal if a traveling speed of the host vehicle is less than or equal to a predetermined speed and the detected object is plural.

According to embodiments of the radar control device and method according to the present disclosure, by analyzing the reception signal using the track data and the received power, it is possible to distinguish the clutter signal and a preceding vehicle so as for the host vehicle traveling at low speed to follow the preceding vehicle.

BRIEF DESCRIPTION OF THE DRAWINGS

FIG. 7 is a flowchart for describing in detail a method of distinguishing between a preceding vehicle and a clutter according to an exemplary embodiment.

DETAILED DESCRIPTION

Figure 1:
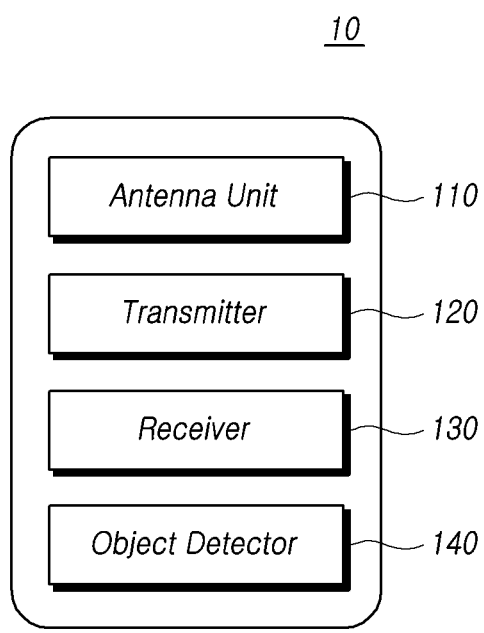
FIG. 1 is a block diagram illustrating a radar control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a radar control device according to an embodiment of the present disclosure with reference to the accompanying drawings.

FIG. 1 is a block diagram illustrating a radar control device according to an embodiment of the present disclosure.

The radar control device 10 according to an embodiment of the present disclosure may include an antenna unit 110, a transmitter 120, a receiver 130, and an object detector 140, and the like.

The radar control apparatus 10 according to an embodiment of the present disclosure may be a detection device for a driver assistance system (DAS) or an advance driver assistance systems (ADAS) which is mounted on the host vehicle 20 and provides information to assist the driving of the host vehicle 20 or provides assistance to the driver to control the host vehicle 20.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

The radar control device 10 may be mounted on the host vehicle 20 to detect an object such as a preceding vehicle 30. Specifically, in the case that there are a plurality of objects detected within the detection range of the radar control device 10 in a situation in which the host vehicle 20 is traveling at a low speed, that is, at a speed lower than a preset speed, the radar control device 10 may classify or distinguish the preceding vehicle and a clutter.

Here, the host vehicle 20 may refer to a vehicle capable of moving on the ground without using a railroad or a built-in line by mounting a prime mover and rolling wheels with the power. The host vehicle 20 may be an electric vehicle which is powered by electricity, and obtains driving energy by rotating a motor with electricity accumulated in a battery rather than obtaining driving energy from combustion of fossil fuels.

The radar control device 10 may be applied to a manned vehicle controlled by a driver of the host vehicle 20, or an autonomous vehicle that automatically travels without driver intervention.

The antenna unit 110 may include one or more transmission antennas and one or more receiving antennas, and each transmission/receiving antenna may be an array antenna in which one or more radiating elements are connected in series by a feed line, but is not limited thereto.

The antenna unit 110 may include a plurality of transmission antennas and a plurality of receiving antennas, and may have various types of antenna array structures according to an arrangement order and an arrangement interval thereof.

The transmitter 120 may provide a function of transmitting a transmission signal through a switched transmission antenna by switching the radar to one of a plurality of transmission antennas included in the antenna unit 110 or transmitting a transmission signal through a multi-transmission channel allocated to the plurality of transmission antennas.

The transmitter 120 may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator.

The receiver 130 may receive a reception signal received by being reflected from an object through a receiving antenna.

In addition, the receiver 130 may provide a function of receiving a reception signal, which is a reflection signal of the transmission signal reflected by a target, through the switched receiving antenna by switching to one of a plurality of receiving antennas, or a function of receiving a reception signal through multi-receiving channels allocated to a plurality of receiving antennas.

The receiver 130 may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

The object detector 140 may determine data of a track 320 for an detected object based on the reception signal, detect an object around a host vehicle 20 based on the determined track, and, if a traveling speed of the host vehicle 20 is less than or equal to a predetermined speed and the detected object is plural, may classify a preceding vehicle 30 and a clutter based on the reception signal.

Figure 2:
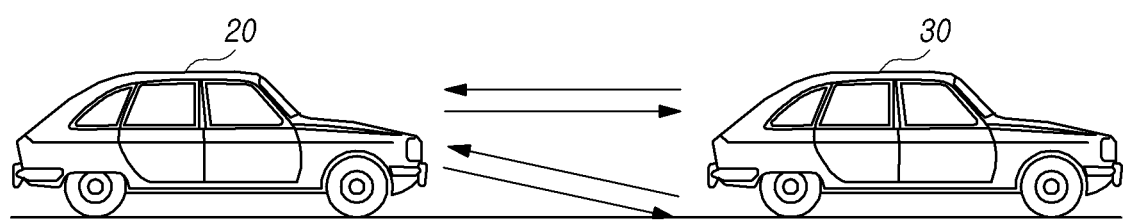
FIG. 2 is a diagram for explaining that a host vehicle traveling at a low speed detects a clutter according to an embodiment.

FIG. 2 is a diagram for explaining that a host vehicle 20 traveling at a low speed detects a clutter according to an embodiment.

Referring to FIG. 2, in the case that the host vehicle 20 is traveling on a road on which a steel structure, etc. exist, the host vehicle 20 may distinguish the road from the preceding vehicle 30 using the traveling speed of the host vehicle 20. However, in the case that the distance from the preceding vehicle 30 is shortened due to a signal stop, an accident, etc., or in the case of traveling at a low speed, such as slow travelling, it is difficult to distinguish between the road and the preceding vehicle 30.

If the host vehicle 20 cannot distinguish the preceding vehicle 30 from the road, the information of the preceding vehicle 30 cannot be accurately acquired, so there may not utilize ADAS such as a smart cruise control (SCC) or an adaptive cruise control (ACC) to follow the preceding vehicle 30. Therefore, the autonomous driving function cannot be performed either.

In order to solve this problem, the radar control device 10 of the present disclosure may determine track data of the track 320 of the preceding vehicle 30 based on the received data to classify the preceding vehicle 30 and the clutter.

Figure 3:
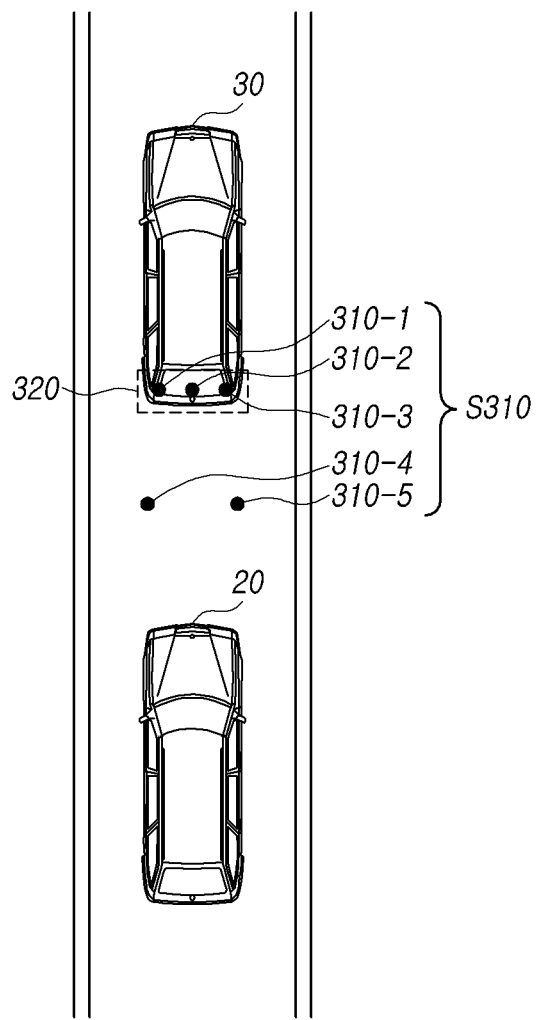
FIG. 3 is a diagram for explaining the classification between a preceding vehicle and a clutter using track data according to an embodiment.

FIG. 3 is a diagram for explaining the classification between a preceding vehicle 30 and a clutter using track data according to an embodiment.

Referring to FIG. 3, if a plurality of measurement values 310 (310-1, 310-2, 310-3, 310-4, 310-5) determined from the reception signal are located within the range of the track 320, the object detector 140 may determine that the measurement values 310 are measured from the reception signal reflected from the preceding vehicle 30.

Specifically, the object detector 140 may set a track 320 for the preceding vehicle 30 based on the received data. The track 320 may include distance and speed information and, as a result of accumulated measurements, may be updated every radar detection period (1st scan, 2nd scan, . . . nth scan) and may have width and length information. For example, the track may be set in the shape of a rectangle, and the size may be set differently according to received data.

The object detector 140 may determine whether the position of the measurement value 310 included in the reception signal is included in the range of the track 320 set as described above.

Referring to FIG. 3, for example, since a plurality of measurement values 310-1, 310-2, and 310-3 are included within the range of the track 320, the object detector 140 may determine that the reception signal corresponding to the measurement values 310 included within the range of the track is a signal reflected from the preceding vehicle 30.

There may be defined a time until the transmitter 120 transmits the radar signal, the receiver 130 receives the reception signal, the object detector 140 processes the reception signal, and the transmitter 120 transmits the radar signal again. This time may be expressed as, for example, a period or an n-th scan.

In an embodiment, the object detector 140 may determine track data of the track 320 based on a reception signal received at a previous time point (e.g., (n−1)th scan), and if a plurality of measurement values 310 at the current time point (e.g., nth scan) are included in the range of the track 320 included in the track data, may determine that the measurement values 310 included in the range of the track 320 are the measurement values 310 reflecting the preceding vehicle 30.

In an embodiment, the object detector 140 may calculate track data based on the reception signal received at the current time point, and if a plurality of measurement values 310 at the current time point are included in the track data of the current time point, may determine that the corresponding measurement values 310 are the measurement values 310 reflecting the preceding vehicle 30.

Figure 4:
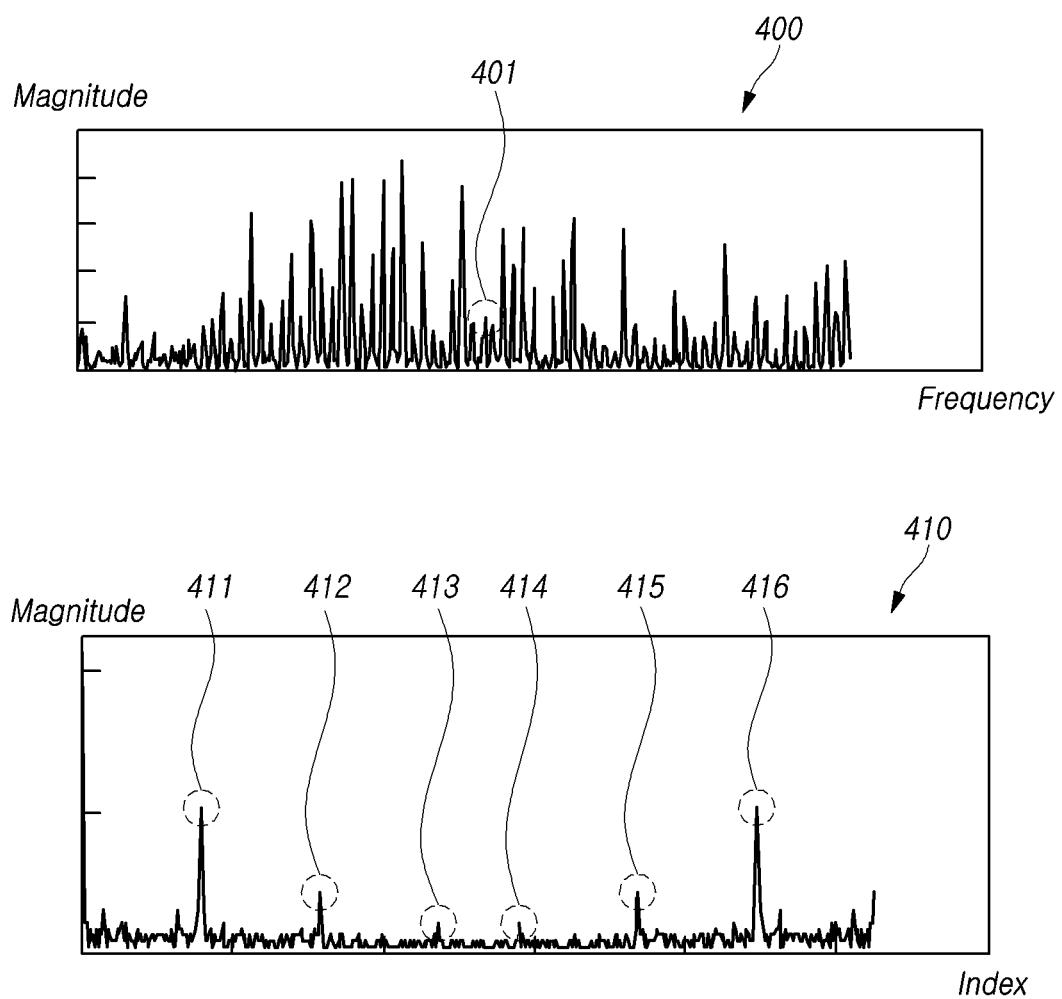
FIG. 4 is a diagram exemplarily illustrating period information extracted through FFT according to an embodiment.

FIG. 4 is a diagram exemplarily illustrating period information extracted through FFT according to an embodiment.

The object detector 140 may determine frequency spectrum information of the reception signal, and determine period information for identifying period information of the frequency spectrum information.

Referring to FIG. 4, the frequency spectrum 400 for the reception signal may include a plurality of peak values due to the clutter signal. Therefore, for example, it may be difficult to detect a target signal 401 through the analysis of the frequency spectrum 400 in the presence of a clutter structure. That is, it is difficult to detect the target object due to the plurality of peak values having a larger magnitude than the target signal. To solve this, a signal analyzer may extract the period information 410 by performing Fast Fourier Transform (FFT) for the frequency spectrum 400. In the period information, the X-axis and the Y-axis are each expressed as an index, and the unit and the like may be variously changed according to a signal processing method for extracting the period information. The period information 410 extracted through FFT may include a plurality of peak value components 411, 412, 413, 414, 415 and 416. The signal analyzer may extract the period information 410 using the frequency spectrum 400, and a determiner may confirm the presence of a clutter structure by checking whether the peak value components 411, 412, 413, 414, 415 and 416 of the period information 410 appear at regular intervals. FIG. 4 illustrates period information of the frequency spectrum 410 in the case where a clutter structure is present.

Figure 5:
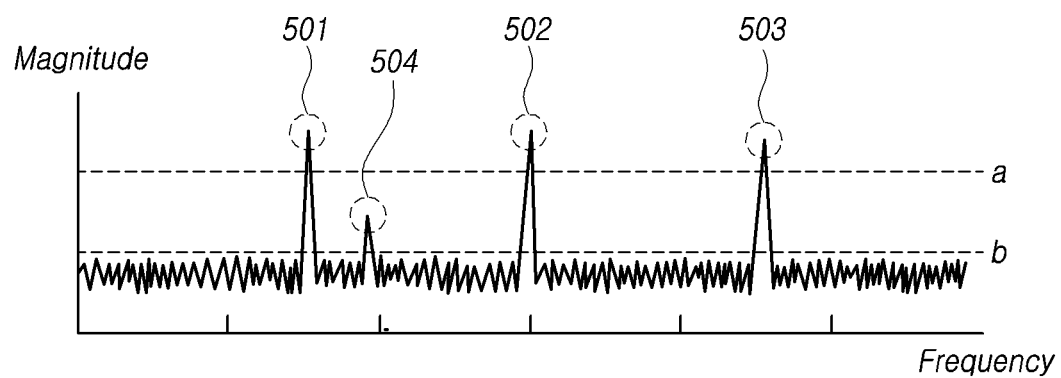
FIG. 5 is a diagram exemplarily illustrating frequency spectrum information according to an embodiment.

FIG. 5 is a diagram exemplarily illustrating frequency spectrum information according to an embodiment.

Referring to FIG. 5, the object detector 140 may classify between the preceding vehicle and the clutter based on a peak value for each frequency in the frequency spectrum information.

In the frequency spectrum information, a signal of the preceding vehicle 30 and signal of a clutter signal may be mixed. Unlike FIG. 4, the frequency spectrum information of in FIG. 5 may be generated in not a case in which a clutter structure exists around the host vehicle 20, but a case in which iron is included in the road on which the host vehicle 20 travels, such as a road under construction.

In addition, as described above, it may be difficult for the device 10 to distinguish between a signal reflected from the ground (road) and a signal reflected from the preceding vehicle 30 through the vehicle speed.

In this case, the object detector 140 may compare each peak value component for each frequency of the frequency spectrum information with a predetermined value, and if the peak value is equal to or greater than a predetermined value, may determine that the corresponding peak value component is a signal for the preceding vehicle 30.

If each peak value component for each frequency of the frequency spectrum information is less than a predetermined value, the object detector 140 may determine that the corresponding peak value component is a clutter signal. In addition, in order to exclude a ghost signal, the clutter signal may have a peak value greater than or equal to a reference value.

Referring to FIG. 5, for example, the object detector 140 may determine that, for the frequency spectrum information, the peak value components 501, 502 and 503 greater than or equal to a predetermined value (e.g., value of "a") as a signal for the preceding vehicle 30.

In addition, since the peak value component such as 504 is less than the predetermined value "a" and greater than or equal to the reference value "b", it can be determined as a signal for the clutter.

The object detector 140 may classify or distinguish the preceding vehicle 30 from the clutter based on the measurement value 310 received within a lane on which the host vehicle 20 travels.

Since a radar is inaccurate with respect to the lateral distance due to its characteristics, if the host vehicle 20 travels in a tunnel, there may be a case in which the reception signal becomes inaccurate due to frequent reflections. To prevent this, the object detector 140 may calculate track data based on the measurement values 310 determined to be located within the lane on which the host vehicle 20 travels among the measurement values 310 included in the reception signal, which is the raw data. In this way, it is possible to distinguish the preceding vehicle 30 from the clutter.

The radar control device 10 and the transmitter 120, the receiver 130 and the object detector 140 included therein may be implemented as an electronic control unit (ECU).

For example, an electronic control unit (not shown) of the object detector 140 may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the radar control device 10 according to the present embodiment and the transmitter 120, the receiver 130 and the object detector 140 included therein may be implemented as a module of a control device or an ECU of a radar system mounted on a vehicle.

The control device or ECU of such a radar system may include a processor, a storage device such as a memory, and a computer program capable of performing a specific function. In addition, the transmitter 120, the receiver 130 and the object detector 140 may be implemented as software modules capable of performing respective corresponding functions.

That is, the transmitter 120, the receiver 130 and the object detector 140 according to the present embodiment may be implemented as respective software modules and stored in a memory, and each software module may be executed at a specific time point in an arithmetic processing unit such as an ECU included in the vehicle radar system.

Hereinafter, it will be described a radar control method using the radar control device 10 capable of performing all of the above-described present disclosure.

Figure 6:
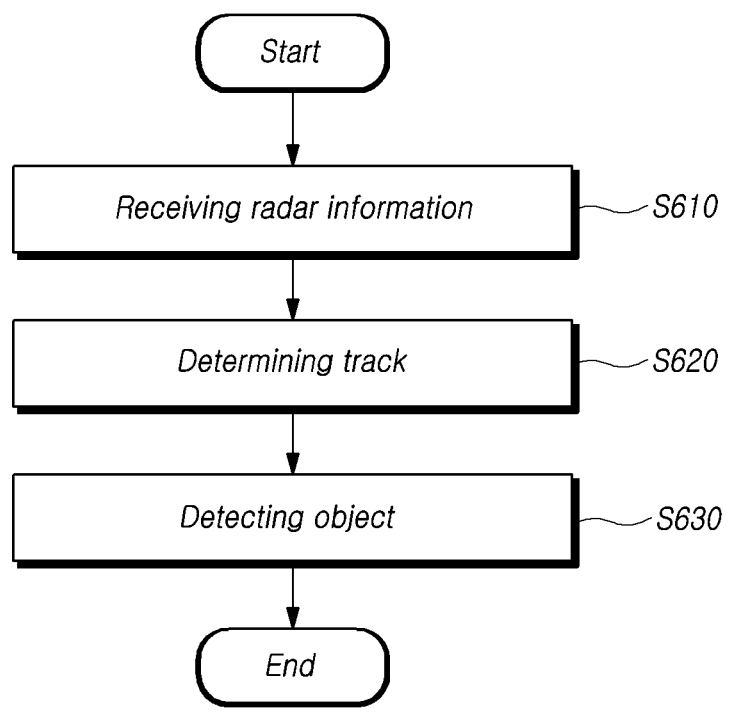
FIG. 6 is a flowchart illustrating a radar control method according to an embodiment of the present disclosure.

FIG. 6 is a flowchart illustrating a radar control method according to an embodiment of the present disclosure.

Referring to FIG. 6, a radar control method according to the present disclosure may include a step S610 of transmitting a radar signal toward an object using a transmission antenna and receiving a reception signal reflected from the object using a receiving antenna, a step S620 of determining a track 320 for an detected object based on the reception signal, and a step S630 of detecting an object around a host vehicle 20 based on the determined track, and classifying a preceding vehicle 30 and a clutter based on the reception signal if a traveling speed of the host vehicle 20 is less than or equal to a predetermined speed and the detected object is plural.

FIG. 7 is a flowchart for describing in detail a method of distinguishing between a preceding vehicle 30 and a clutter according to an exemplary embodiment.

Referring to FIG. 7, the radar control device 10 may receive the reception signal and determine whether the vehicle speed of the host vehicle 20 is equal to or less than a predetermined speed based on the reception signal (S710).

If the vehicle speed of the host vehicle 20 is less than or equal to a predetermined speed (Yes—S710), the radar control device 10 may determine whether the preceding vehicle 30 exists in front of the host vehicle 20 (S720). Here, the determination of the presence of the preceding vehicle 30 may be determined based on the reception signal at a previous time point. In addition, the radar control device 10 may receive image information from an image sensor mounted on the host vehicle 20, and determine whether the preceding vehicle is present by additionally considering the image information. In an embodiment, the image sensor may include a camera, a lidar sensor, and the like. In addition, the output of the image sensor may be processed as image information by a processor included in each image sensor, that is, a camera, a lidar sensor, etc, a camera system, or a domain control unit (DCU) implemented as a higher level integrated control system. The radar control device 10 may receive image information from each image sensor including a processor, a camera system, or a domain control unit, and may determine whether the preceding vehicle exists by additionally considering the image information.

If the preceding vehicle 30 is present in front of the host vehicle 20 (Yes—S720), the radar control device 10 determines whether two or more measurement values 310 are included within the range of the track (S730).

In the case that two or more measurement values 310 are included within the range of the track 320 (Yes—S730), the radar control device 10 may determine whether the position of the measurement value 310 is located within the driving lane of the host vehicle 20 (S740). In one example, if the measurement value 310 is received at both ends of the driving lane of the host vehicle 20, the radar control device may determine whether the measurement value 310 is a signal reflected by a guard rail or a curb based on the distance between the measurement value 310 and the host vehicle 20.

If the position of the measurement value 310 is located within the driving lane of the host vehicle 20 (Yes—S740), the radar control device 10 may calculate the frequency spectrum information of the reception signal, and may determine whether a peak value component corresponding to each frequency of the calculated frequency spectrum information is less than or equal to a predetermined value (S750).

In an embodiment, the radar control device 10 may calculate period information for confirming the period of the frequency spectrum information of the reception signal, and may determine the presence or absence of the steel structure within the detection range of the radar control device 10 based on the calculated period information. In addition, the period information may be calculated by performing FFT on the frequency spectrum.

If the peak value component corresponding to each frequency of the frequency spectrum information is less than or equal to a predetermined value (Yes—S750), the radar control device 10 may determine that the reception signal is based on a clutter (S760).

If less than two measurement values 310 are included within the range of the track 320 (No—S730), the radar control device 10 may determine that the measurement value 310 is a reception signal reflected from the preceding vehicle 30 (S770). That is, the radar control device 10 may determine that the measurement value 310 is based on the preceding vehicle 30.

In addition, if the peak value component of the frequency spectrum information exceeds a predetermined value (No—S750), the radar control device 10 may determine that the reception signal is based on the preceding vehicle 30 (S770).

As described above, according to the present disclosure, the radar control device and method may distinguish between the clutter signal and the preceding vehicle by analyzing the reception signal through the track data and the power of the reception signal, so that the host vehicle traveling at low speed can follow the preceding vehicle.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control device comprising:
an antenna unit including one or more transmission antennas and one or more receiving antennas;
a transmitter for transmitting a radar signal toward an object using the transmission antenna;
a receiver for receiving a reception signal reflected from the object using the receiving antenna; and
an object detector configured to determine a track for a detected object based on the reception signal, detect an object around a host vehicle based on the determined track, and, in response to a traveling speed of the host vehicle being less than or equal to a predetermined speed and the detected object being plural, classify a preceding vehicle and a clutter based on the reception signal,
wherein the object detector determines frequency spectrum information of the reception signal, and determines that the reception signal is based on a clutter in response to a peak value component corresponding to each frequency of the frequency spectrum information being less than or equal to a predetermined value.

2. The radar control device of claim 1, wherein, in response to a plurality of measurement values determined from the reception signal being located within a range of the track, the object detector determines that the plurality of measurement values is measured from a reception signal reflected from the preceding vehicle.

3. The radar control device of claim 1, wherein the object detector classifies between the preceding vehicle and the clutter based on measurement values determined to be located within a lane in which the host vehicle travels.

4. The radar control device of claim 1, wherein the object detector determines period information for identifying period information of the frequency spectrum information.

5. The radar control device of claim 4, wherein the object detector determines the period information by performing Fast Fourier Transform (FFT) on the frequency spectrum information.

6. The radar control device of claim 5, wherein the object detector classifies between the preceding vehicle and the clutter based on a peak value for each frequency in the frequency spectrum information.

7. A radar control method comprising:
transmitting a radar signal toward an object using a transmission antenna and receiving a reception signal reflected from the object using a receiving antenna;
determining a track for a detected object based on the reception signal; and
detecting an object around a host vehicle based on the determined track, and classifying a preceding vehicle and a clutter based on the reception signal in response to a traveling speed of the host vehicle being less than or equal to a predetermined speed and the detected object being plural,
wherein the detecting an object comprises determining frequency spectrum information of the reception signal, and determining that the reception signal is based on a clutter in response to a peak value component corresponding to each frequency of the frequency spectrum information being less than or equal to a predetermined value.

8. The radar control method of claim 7, wherein detecting an object comprises, in response to a plurality of measurement values determined from the reception signal being located within a range of the track, determining that the plurality of measurement values is measured from a reception signal reflected from the preceding vehicle.

9. The radar control method of claim 7, wherein detecting an object comprises classifying between the preceding vehicle and the clutter based on measurement values determined to be located within a lane in which the host vehicle travels.

10. The radar control method of claim 7, wherein detecting an object comprises determining period information for identifying period information of the frequency spectrum information.

11. The radar control method of claim 10, wherein detecting an object comprises determining the period information by performing Fast Fourier Transform (FFT) on the frequency spectrum information.

12. The radar control method of claim 10, wherein detecting an object comprises classifying between the preceding vehicle and the clutter based on a peak value for each frequency in the frequency spectrum information.

* * * * *